United States Patent
Lim et al.

(10) Patent No.: US 10,073,324 B2
(45) Date of Patent: Sep. 11, 2018

(54) SECURITY CAMERA SYSTEM

(71) Applicant: Hanwha Techwin Co., Ltd., Changwon-si (KR)

(72) Inventors: YongSeob Lim, Changwon-si (KR); Kazushige Tamura, Changwon-si (KR); Chang Yeon Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 15/414,864

(22) Filed: Jan. 25, 2017

(65) Prior Publication Data
US 2017/0363932 A1     Dec. 21, 2017

(30) Foreign Application Priority Data
Jun. 17, 2016   (KR) .................. 10-2016-0075828

(51) Int. Cl.
| | | |
|---|---|---|
| *G03B 17/02* | (2006.01) | |
| *G03B 17/56* | (2006.01) | |
| *G03B 15/03* | (2006.01) | |
| *F16M 11/10* | (2006.01) | |
| *F16M 11/18* | (2006.01) | |
| *F16M 11/20* | (2006.01) | |

(52) U.S. Cl.
CPC .............. *G03B 17/02* (2013.01); *F16M 11/10* (2013.01); *F16M 11/18* (2013.01); *F16M 11/2014* (2013.01); *G03B 15/03* (2013.01); *G03B 17/561* (2013.01); *F16M 2200/041* (2013.01); *G03B 2215/0503* (2013.01)

(58) Field of Classification Search
CPC ...... G03B 17/02; G03B 17/561; G03B 15/03; F16M 11/00; F16M 11/18; F16M 11/2014
USPC ........................................................... 396/176
See application file for complete search history.

(56) References Cited

U.S. PATENT DOCUMENTS

| | | | | |
|---|---|---|---|---|
| 4,080,629 | A | * | 3/1978 | Hammond ....... G08B 13/19619 348/143 |
| 4,728,839 | A | * | 3/1988 | Coughlan .............. F16M 11/18 248/183.4 |
| 6,707,619 | B1 | | 3/2004 | Okuno |
| 7,717,629 | B2 | | 5/2010 | Kenoyer et al. |
| 7,955,006 | B1 | * | 6/2011 | Harvey .................. F16M 11/10 396/12 |
| 2008/0136909 | A1 | * | 6/2008 | Berkey .............. G05B 19/4062 348/143 |
| 2009/0154912 | A1 | | 6/2009 | Lin et al. |

(Continued)

FOREIGN PATENT DOCUMENTS

| | | |
|---|---|---|
| KR | 10-0531505 B1 | 11/2005 |
| KR | 10-0640670 B1 | 11/2006 |
| WO | 2004/086754 A1 | 10/2004 |

*Primary Examiner* — Christopher Mahoney
(74) *Attorney, Agent, or Firm* — Sughrue Mion, PLLC (57) ABSTRACT

A security camera system includes: a camera module; a support portion arranged at one side of the camera module and connected to a housing bracket or an outside structure; a tilt axis portion connected to one side of the camera module and coupled to the support portion to be rotatable relative to the support portion; and a tilt motor configured to transfer a rotation force to the tilt axis portion and revolve around a rotation axis of the tilt axis portion during rotation of the tilt axis portion.

20 Claims, 4 Drawing Sheets

(56) References Cited

U.S. PATENT DOCUMENTS

2014/0043478 A1\* 2/2014 Burton ................ H04N 5/2254
 348/143
2016/0070154 A1\* 3/2016 Lai ...................... G03B 17/561
 396/428

\* cited by examiner

SECURITY CAMERA SYSTEM

CROSS-REFERENCE TO THE RELATED APPLICATION

This application claims priority from Korean Patent Application No. 10-2016-0075828, filed on Jun. 17, 2016, in the Korean Intellectual Property Office, the disclosure of which is incorporated herein in its entirety by reference.

BACKGROUND

1. Field

Apparatuses consistent with exemplary embodiments relate to a security camera system, and more particularly, to a security camera system which may simplify driving mechanism and improve space use efficiency.

2. Description of the Related Art

In general, a closed circuit television (CCTV) system that is a closed circuit monitoring system is installed in places such as houses, department stores, bank, exhibition halls, factories, etc. to prevent thefts or easily monitor a process flow or an operating state of a machine.

In detail, in the CCTV system, images of a plurality of security zones to be managed are captured by using security cameras installed in each security zone, the captured images are transmitted to monitors installed in an office for surveillance through the monitors, and if necessary, only desired scenes are recorded by using a video cassette recorder (VCR).

The security cameras used for the CCTV system may include a fixed camera capable of monitoring only a designated area only in a security zone and a rotatable camera capable of rotating in at least one direction to monitor the entire area of a security zone. For example, the rotatable camera may have a tilt operation while moving up and down. In addition, the rotatable camera may perform a pan operation pivoting left and right or a zoom operation changing a focal distance of a lens.

Figure 1:
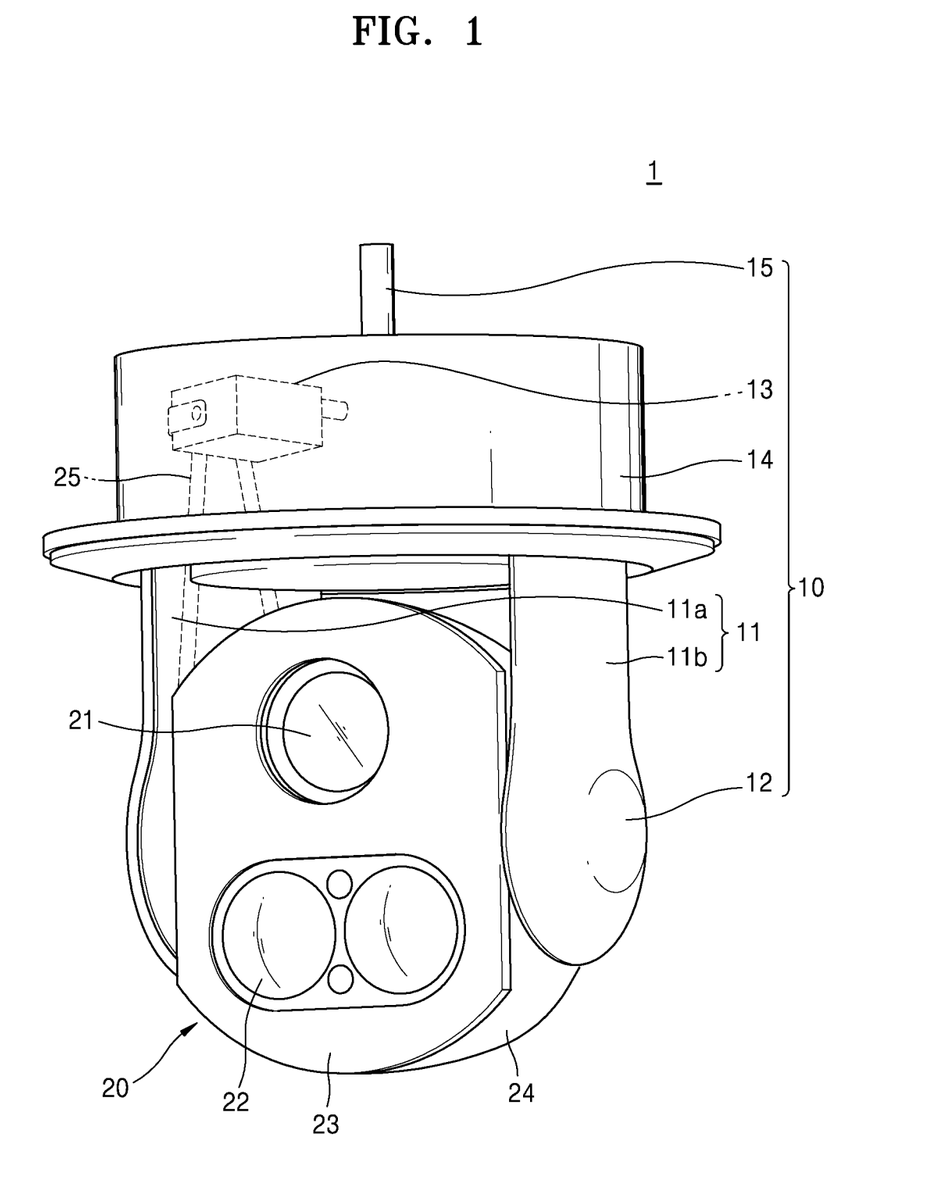
FIG. 1 is a perspective view of a security camera system 1 capable of performing a tilt operation, according to a related art.

FIG. 1 is a perspective view of a security camera system 1 capable of performing a tilt operation, according to a related art.

The security camera system 1 may include a camera portion 20 and a driving portion 10. The camera portion 20 may include a camera module 21 and a light projecting portion 22. The driving portion 10 may include a support portion 11, a tilt axis portion 12, a tilt motor 13, a housing 14, and a pan axis portion 15.

The camera module 21 may include an optical system (not shown), an imaging device (not shown), a lens (not shown), and a lens cover (not referenced). While the camera module 21 is arranged in a body portion 24, a front cover 23 for exposing the lens cover of the camera module 21 is coupled to a front surface of the body portion 24. Accordingly, the camera module 21 may perform an image capturing operation through the lens cover exposed to the outside.

The light projecting portion 22 is arranged in the body portion 24 close to the camera module. The light projecting portion 22 irradiates an infrared light ray to the front side to enable an image capturing operation in the nighttime when a sufficient light source is difficult to obtain.

The support portion 11 is arranged at both opposite sides of the camera module 21. The support portion 11 may include a first support portion 11a and a second support portion 11b. The first support portion 11a is arranged at one side of the camera module 21 and the second support portion 11b is arranged at the other side of the camera module 21.

A tilt axis portion 12 is coupled to the first support portion 11a and the second support portion 11b. The body portion 24 having the camera module 21 performs a tilt operation according to the rotation of the tilt axis portion 12.

The housing 14 is arranged above the body portion 24. The first support portion 11a and the second support portion 11b are coupled to each other in the housing 14. A tilt motor 13 is located at one side of the first support portion 11a. Accordingly, the tilt motor 13 may be fixed in the housing 14.

The tilt motor 13 may be coupled to the tilt axis portion 12 by a belt 25. Accordingly, a drive force of the tilt motor 13 is transferred to the tilt axis portion 12 via the belt 25 so that the tilt axis portion 12 is rotated.

The pan axis portion 15 is coupled to the housing 14. The body portion 24 having the camera module 21 performs a pan operation according to the rotation of the pan axis portion 15. The pan axis portion 15 is rotated by being driven by a pan motor (not shown) located at the housing 14.

However, for the security camera system 1, since the support portion 11 supporting the camera module 21 is arranged at both side surfaces of the camera module 21 and a separate space for fixing the tilt motor 13 that transfers a rotation force to the tilt axis portion 12 is needed, a large number of parts are needed and space use efficiency is low. Furthermore, as the tilt axis portion 12 and the tilt motor 13 are arranged spaced apart from each other by a considerable distance, the structure of the security camera system 1 is complicated and the size thereof increases as well.

SUMMARY

One or more embodiments include a security camera system, which may simplify driving mechanism and improve space use efficiency.

Various aspects of the inventive concept will be set forth in part in the description which follows and, in part, will be apparent from the description, or may be learned by practice of the presented embodiments.

According to one or more embodiments, there is provided a security camera system which may include: a camera module; a support portion arranged at one side of the camera module and connected to a housing bracket or an outside structure; a tilt axis portion connected to one side of the camera module and coupled to the support portion to be rotatable relative to the support portion; and a tilt motor configured to transfer a rotation force to the tilt axis portion and revolve around a rotation axis of the tilt axis portion during rotation of the tilt axis portion.

The security camera system may further include a light projecting portion arranged in opposition to the camera module with respect to the rotation axis of the tilt axis portion.

The light projecting portion may include a light source for emitting an infrared ray.

An optical axis of the light projecting portion may be parallel to an optical axis of the camera module.

The tilt motor may be arranged in opposition to the camera module with respect to the rotation axis of the tilt axis portion.

The support portion may extend in a direction crossing a section of the tilt axis portion.

The security camera system may include only one support portion.

The support portion may be arranged at one side of the camera module and may not be arranged at another side of the camera module.

The support portion may have a cantilever shape.

The tilt motor may be coupled to the tilt axis portion by a belt.

The tilt motor may include a tension bearing for adjusting tension of the belt.

The rotation axis of the tilt axis portion and a rotation axis of the tilt motor may be parallel to each other.

Mass of the tilt motor may be smaller than mass of the camera module.

The security camera system may further include a light projecting portion arranged in opposition to the camera module with respect to the rotation axis of the tilt axis portion and having mass smaller than mass of the camera module.

The mass of the camera module may be equal to a sum of mass of the tilt motor and mass of the light projecting portion.

The security camera system may further include a counter weight arranged spaced apart from the rotation axis of the tilt axis portion in a lengthwise direction of the support portion.

The security camera system may further include only one oil seal interposed between the support portion and the tilt axis portion

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The inventive concept is described in detail with reference to the accompanying drawings. However, the inventive concept is not limited thereto and it will be understood that various changes in form and details may be made therein without departing from the spirit and scope of the inventive concept. That is, descriptions on particular structures or functions may be presented merely for explaining exemplary embodiments of the inventive concept.

Terms such as "first" and "second" are used herein merely to describe a variety of constituent elements, but the constituent elements are not limited by the terms. Such terms are used only for the purpose of distinguishing one constituent element from another constituent element.

It will be understood that when a layer, region, or component is referred to as being "formed on" another layer, region, or component, it can be directly or indirectly formed on the other layer, region, or component. That is, for example, intervening layers, regions, or components may be present.

In the drawings, the thicknesses of multiple layers and regions are exaggerated for clarity. The thicknesses of some layers and regions in the drawings may be exaggerated for convenience of explanation. Like reference numerals in the drawings denote like elements, and thus their description will not be repeated.

Figure 2:
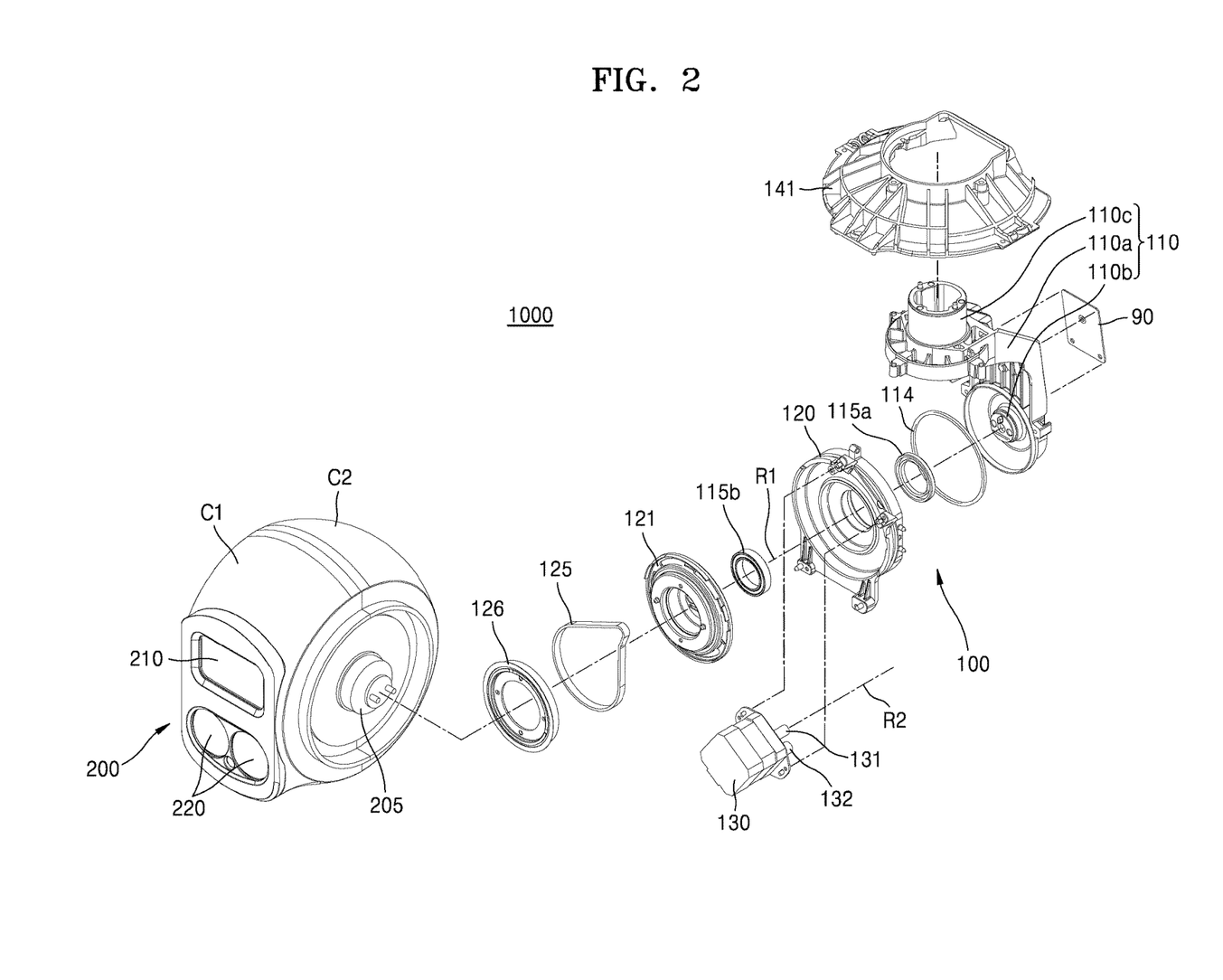
FIG. 2 is an exploded perspective view of a security camera system, according to an exemplary embodiment.
Figure 3:
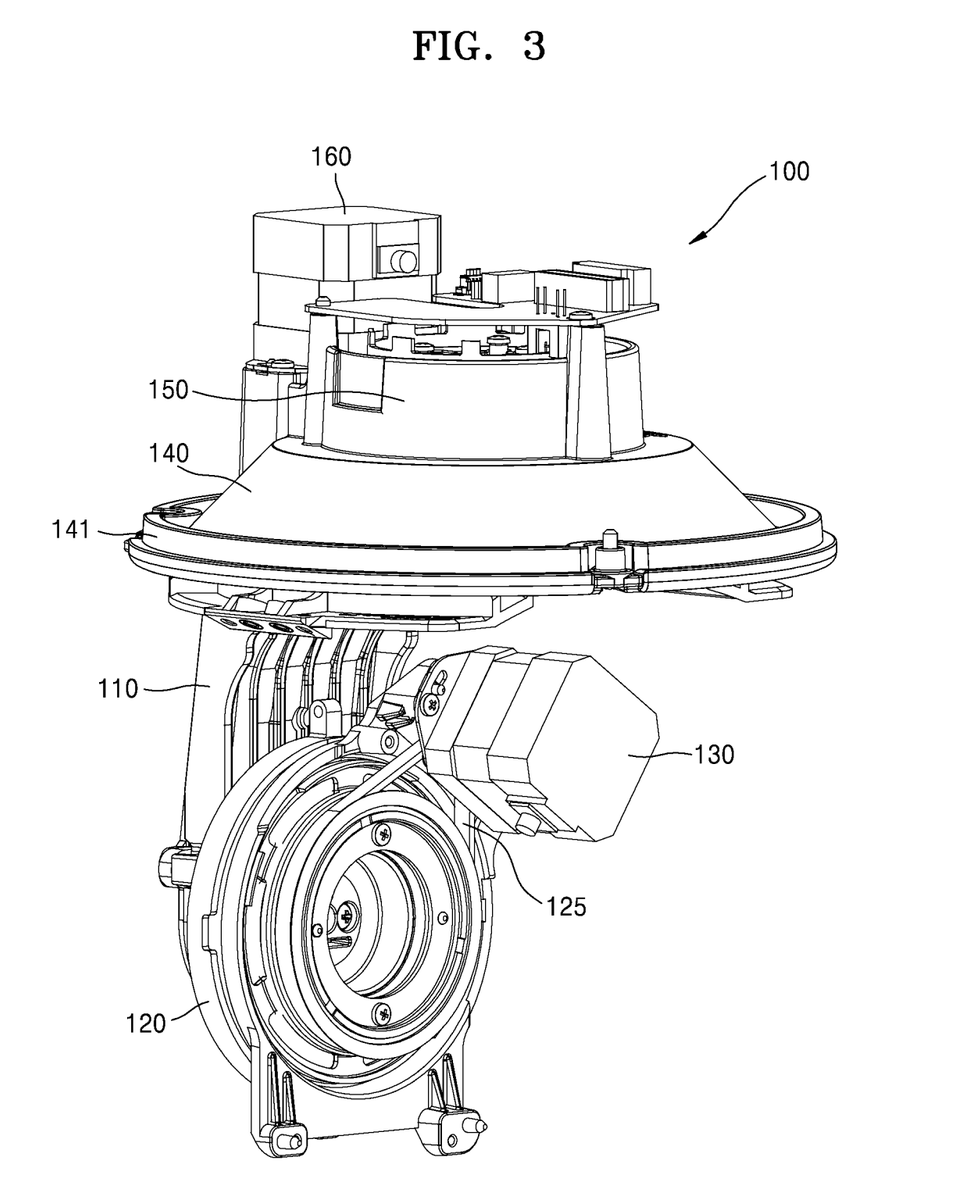
FIG. 3 is a perspective view of a driving portion of the security camera system of FIG. 2, according to an exemplary embodiment.

FIG. 2 is an exploded perspective view of a security camera system 1000, according to an exemplary embodiment. FIG. 3 is a perspective view of a driving portion 100 of the security camera system 1000 of FIG. 2, according to an exemplary embodiment.

Referring to FIGS. 2 and 3, the security camera system 1000 according to the embodiment may include a camera portion 200 and a driving portion 100. The camera portion 200 for performing an image capturing operation may include a camera module 210. The driving portion 100 for rotating the camera portion 200 in at least one direction may include a support portion 110, a tilt axis portion 120, and a tilt motor 130.

The camera portion 200 may include a first cover C1 and a second cover C2 forming an exterior of the camera portion 200. The camera module 210 is arranged in an internal space formed as the first cover C1 and the second cover C2 are coupled to each other. The first cover C1 and the second cover C2 protect and support internal parts, for example, the camera module 210 of the camera portion 200. Also, a light projecting portion 220 is arranged in the internal space formed by the first cover C1 and the second cover C2. Detailed descriptions of the camera module 210, the light projecting portion 220, and other internal parts of the camera portion 200 are presented with reference to FIG. 4.

The support portion 110 is connected to the camera portion 200 having the camera module 210, to support the camera portion 200. The support portion 110 is arranged at one side of the camera module 210. In this state, the support portion 110, unlike the support portion 11 of FIG. 1, is arranged only at one side of the camera module 210, not at two opposite side of the camera module 210. In other words, only one support portion 110 supports the camera portion 200. As such, when the support portion 110 that supports only one side of the camera portion 200, manufacturing costs may be reduced compared to the security camera system 1 according to the related art in which the two support portions 11 support the camera portion 20 from both sides as illustrated in FIG. 1. Also, since the number of necessary parts is reduced, an assembly feature may be improved. In addition, since a space for a support structure outside the camera portion 200 decreases, space use efficiency may be improved.

A tilt PCB 90 may be arranged at a side of the support portion 110 opposite to a side where the camera portion 200 is arranged. The tilt PCB 90 is connected to the tilt motor 130 so that electric power may be supplied to the tilt motor 13, and may be protected from rain by a waterproof cover (not shown).

The support portion 110 has a cantilever shape. In detail, the support portion 110 may include an extension portion 110a, a first coupling portion 110b, and a second coupling portion 110c. The extension portion 110a is a portion extending in a direction crossing a section of the tilt axis portion 120. The first coupling portion 110b is arranged at one end of the extension portion 110a and the second coupling portion 110c is arranged at the other end of the extension portion 110a. The second coupling portion 110c is coupled to a housing bracket 141 arranged above and fixes the support portion 110 to the housing bracket 141. Accordingly, the support portion 110 takes a similar action to a cantilever having a fixedly supported end portion. Since the support portion 110 is fixed to the housing bracket 141, rotations of the support portion 110 in upper and lower directions are restricted or prevented. Accordingly, during the tilt motion of the camera portion 200, the support portion 110 that is fixed relative to the camera portion 200 does not rotate in the upper and lower directions.

As illustrated in FIG. 3, a pan axis portion 150 for rotating the camera portion 200 in the left and right directions to perform a pan operation may be arranged at a center of a housing 140. The housing 140 covers and protects the camera portion 200, the support portion 110, the tilt axis portion 120, and the tilt motor 130, and supports the driving portion 100. The driving portion 100 may include not only the support portion 110, the tilt axis portion 120, and the tilt motor 130, but also the pan axis portion 150 and a pan motor 160 as described above, which represents an entire portion for driving the rotation of the camera portion 200.

The pan motor 160 may be placed on the housing bracket 141 to transfer a rotational force to the pan axis portion 150. Since the pan motor 160 is fixedly placed on the housing bracket 141, the pan motor 160 does not rotate to the left and right during a pan operation of the camera portion 200.

The tilt axis portion 120 is arranged on the first coupling portion 110b of the support portion 110. The tilt axis portion 120 may be arranged to rotate around a rotation axis R1 that penetrates through a center of the tilt axis portion 120. The support portion 110 is fixed relative to the tilt axis portion 120, and a bearing 115a is coupled to one side of the tilt axis portion 120. Accordingly, during the rotation of the tilt axis portion 120, a frictional force between the tilt axis portion 120 and the first coupling portion 110b is reduced.

An oil seal 114 may be provided between the support portion 110 and the tilt axis portion 120. The oil seal 114 prevents intrusion of rain or dust into the bearing 115 coupled to the first coupling portion 110b and the tilt axis portion 120. Since only one support portion 110 for supporting the camera portion 200 exists, only one oil seal 114 is used. For the security camera system 1 of FIG. 1, an oil seal (not shown) is provided for each of the first support portion 11a and the second support portion 11b supporting both sides of the camera portion 20, at least two oil seals may be provided. In this case, a frictional load increases much during the tilt operation of the camera portion 20 and thus the tilt motor 130 for rotating the tilt axis portion 120 may not be rotated by a desired angle, that is, a step-out phenomenon may be generated. Accordingly, as in the present exemplary embodiment, since the camera portion 200 is supported by only one support portion 110, only one oil seal 114 is used as well and thus the step-out phenomenon of the tilt motor 130 due to the oil seal 114 may be much prevented.

A tilt axis portion bracket 121 is placed in the tilt axis portion 120 to connect the tilt axis portion 120 and the camera portion 200. In this state, a bearing 115b is provided between the tilt axis portion bracket 121 and the tilt axis portion 120 and thus a frictional force between the tilt axis portion 120 and the tilt axis portion bracket 121 is reduced. Accordingly, during the rotation of the tilt axis portion 120, the rotation of the tilt axis portion bracket 121 may be smoothly made.

A tilt gear 126 is coupled to the tilt axis portion bracket 121. After the coupling, a belt 125 is wound around a portion of the tilt gear 126 protruding from the tile axis portion bracket 121. In detail, a part of the belt 125 is arranged to encompass at least a part of an outer circumferential surface of the tilt gear 126, whereas the other part of the belt 125 extends toward a motor axis portion 131 of the tilt motor 130 to be wound around the motor axis portion 131. Accordingly, the rotational force generated by the tilt motor 130 is transferred to the tilt axis portion bracket 121 to rotate the tilt axis portion 120. The belt 125 may be manufactured in various types. For example, a timing belt having less slip and a good power transfer feature may be used as the belt 125.

As described above, the tilt motor 130 is coupled to the tilt axis portion 120 via the belt 125. In detail, the motor axis portion 131 of the tilt motor 130 and the tilt gear 126 coupled to the tilt axis portion bracket 121 are coupled to each other by the belt 125 so that the rotational force of the tilt motor 130 is transferred to the tilt axis portion 120. A tension bearing 132 may be provided on the tilt motor 130 to adjust tension of the belt 125. The tension of the belt 125 is adjusted as the tension bearing 132 contacts an inner side or an outer side of the belt 125 to press the belt 125. Although FIG. 2 illustrates that the tension bearing 132 is provided in the tilt motor 130, the inventive concept is not limited thereto, and the tension bearing 132 may be provided in the tilt axis portion 120, or in both of the tilt motor 130 and the tilt axis portion 120. In order to stably transfer the rotational force generated by the tilt motor 130 to the tilt axis portion 120, the rotation axis R1 of the tilt axis portion 120 may be substantially parallel to a motor rotation axis R2 of the tilt motor 130.

The tilt motor 130 may be coupled to the tilt axis portion 120 by using screws or bolts. The tilt motor 130 is coupled to a portion around an outer edge of the tilt axis portion 120 so that the rotation of the motor axis portion 131 is not restricted and also a sufficient power transfer distance may be obtained. As the tilt motor 130 and the tilt axis portion 120 are coupled to each other, the tilt motor 130 is rotated with the tilt axis portion 120. In other words, when the tilt axis portion 120 is rotated by the rotational force received from the tilt motor 130, the tilt motor 130 coupled to the tilt axis portion 120 revolves around the rotation axis R1 of the tilt axis portion 120 and rotates with the tilt axis portion 120. As such, as the tilt axis portion 120 and the tilt motor 130 are rotated together, the tilt axis portion 120 and the tilt motor 130 perform a rotation motion relative to the support portion 110 that is fixed to the housing bracket 141.

The camera portion 200 is coupled to the tilt axis portion bracket 121. Accordingly, the camera portion 200 is arranged at the opposite side to the support portion 110 with the tilt axis portion 120 interposed therebetween. As such, as the camera portion 200 is coupled to the tilt axis portion bracket 121, during the rotation of the tilt axis portion 120, the camera portion 200 performs a tilt motion by rotating in the upper and lower directions. The structure of the camera portion 200 is described below in detail with reference to FIG. 4.

Figure 4:
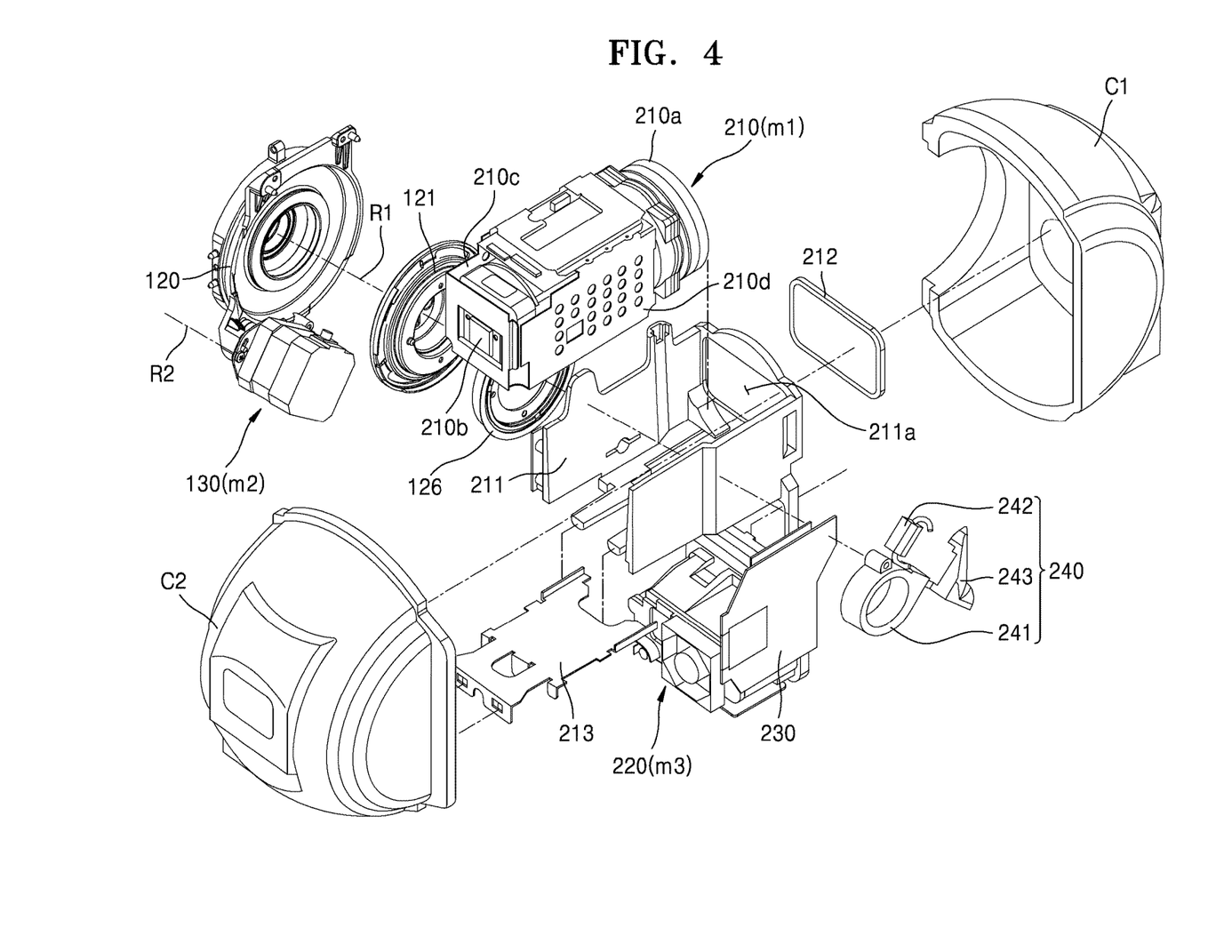
FIG. 4 is an exploded perspective view of a camera portion of the security camera system of FIG. 2, according to an exemplary embodiment.

FIG. 4 is an exploded perspective view of the camera portion 200 of the security camera system 1000 of FIG. 2, according to an exemplary embodiment. In FIG. 4, only some elements of the driving portion 100 of FIGS. 2 and 3 are illustrated to describe positional relations to the camera portion 200, and the other elements are omitted. Also, for convenience of explanation, mass of an element is indicated in parentheses for some reference numerals in FIG. 4.

Referring to FIG. 4, the camera module 210 is arranged at one side of the tilt axis portion 120 to which the tilt motor 130 is coupled. As described above, the tilt axis portion 120 is arranged between the camera module 210 and the support portion 110, which are illustrated in FIG. 2. The tilt axis portion bracket 121, the tilt gear 126, etc. may be further arranged between the tilt axis portion 120 and the camera module 210. The tilt motor 130 is coupled to the tilt axis portion 120 to be adjacent to the outer edge of the tilt axis portion 120. Accordingly, the tilt motor 130 is arranged spaced apart in a radial direction from the rotation axis R1 of the tilt axis portion 120. The tilt motor 130 has a mass of m2.

The camera module 210 may include a lens 210*a* in a front side thereof, a body portion 210*c* extending from the lens 210*a*, and a casing portion 210*d* surrounding the body portion 210*c* and protecting internal parts. The lens 210*a* is a zoom lens, and the camera module 210 may perform a zooming operation by using the lens 210*a*. A barrel (not shown), in which a plurality of lenses including the lens 210*a* are placed, is arranged in the body portion 210*c*. The body portion 210*c* may have a rectangular box shape considering convenience of assembly. Also, an image sensor 210*b* is provided on a rear surface of the camera module 210 to detect contrast or color of a captured image and convert the contrast or color to electrical signals. An image sensor printed circuit board (PCB) (not shown) is placed on the body portion 210*c* to output to the outside or receive from the outside various signals and electrical signals generated by the image sensor 210*b*. For example, a complementary metal-oxide semiconductor (CMOS) sensor or a charge-coupled device (CCD) sensor may be used as the image sensor 210*b*. The camera module 210 having the above structure has a mass of m1.

The camera module 210 is accommodated in an internal space of a main bracket 211 having an empty box shape. Cover glass 212 is arranged on a front surface of the main bracket 211 where the camera module 210 is accommodated, to protect the lens 210*a* of the camera module 210. A support bracket 213 is coupled to the body portion 210*c* of the camera module 210. As the support bracket 213 is coupled to the main bracket 211, the camera module 210 may be stably supported on the main bracket 211. Although it is not illustrated in detail in FIG. 4, the support bracket 213 is formed to have grooves and protrusions so as to be firmly assembled to the main bracket 211 while reducing the number of coupling parts such as screws or bolts.

Also, the light projecting portion 220 is coupled to the main bracket 211. The light projecting portion 220 is arranged under the camera module 210 and has a mass of m3. The light projecting portion 220 may include a light source for emitting light to the front side. For example, the light source may emit an infrared ray. Accordingly, as the infrared ray is irradiated to the front side, an image may be captured in the nighttime or in a dark place where natural light is not sufficient. Accordingly, the light projecting portion 220 is coupled to the main bracket 211 by being exposed to the outside to facilitate projection of light such as an infrared ray. Also, in order to obtain a quality image by substantially matching a viewing range of the camera module 210 and a light projection range of the light projecting portion 220, the light projecting portion 220 and the camera module 210 may be arranged such that an optical axis of the light projecting portion 220 is parallel to an optical axis of the camera module 210 at its maximum.

In addition, a main PCB 230 is coupled to the main bracket 211. The main PCB 230 may be arranged at a side of the main bracket 211 opposite to a side coupled to the tilt axis portion 120. The main PCB 230 may include a connector (not shown) for connecting a power apparatus and an external device. Also, a blower portion 240 is coupled to the main bracket 211 to be adjacent to the main PCB 230. The blower portion 240 may include a blower 241, a heater 242, and a flow guide 243. A condensation phenomenon that may be generated in the cover glass 212 may be prevented by blowing of the blower 241 and/or heating of the heater 242. Water drops formed on the cover glass 212 due to rain or condensation may be guided by the flow guide 243 to be discharged to the outside.

To hermetically seal a structure in which the camera module 210, the light projecting portion 220, etc. are coupled to the main bracket 211, the first cover C1 is coupled to the front surface of the main bracket 211 where the cover glass 212 is arranged, whereas the second cover C2 is coupled to the rear surface of the main bracket 211 that is the opposite surface to the front surface.

The security camera system 1000 according to the present exemplary embodiment in which various parts are assembled as described above may need to reduce an eccentric weight to prevent vibration, noise, and a step-out phenomenon of the tilt motor 130 and also perform a stable tilt operation. In other words, during the rotation of the tilt axis portion 120, it is important that the rotation center of the tilt axis portion 120 is located on the rotation axis R1 of the tilt axis portion 120 at its maximum. In the following description, a method of reducing the eccentric weight is described in detail with reference to FIGS. 2 and 4.

In order to locate the rotation center of the tilt axis portion 120 of FIGS. 2 and 4 on the rotation axis R1 of the tilt axis portion 120 as close as possible, it is necessary to reduce generation of weight eccentricity in the upper and lower directions, which is a rotation direction during a tilt operation. The upper and lower directions mean a lengthwise direction of the support portion 110 of FIG. 2, that is, a direction in which the extension portion 110*a* of the support portion 110 extends.

As one of the methods to reduce the eccentric weight in the upper and lower directions, the light projecting portion 220 is arranged in opposition to the camera module 210 with respect to the rotation axis R1 of the tilt axis portion 120. In detail, when the camera module 210 is arranged above the rotation axis R1 of the tilt axis portion 120, to remove an eccentric weight due to the camera module 210, the light projecting portion 220 is arranged under the rotation axis R1. Similarly, the tilt motor 130 is also arranged in opposition to the camera module 210 with respect to the rotation axis R1 of the tilt axis portion 120. Accordingly, the tilt motor 130 may be arranged under the rotation axis R1 with the light projecting portion 220.

In general, a mass m1 of the camera module 210 is greater than each of a mass m2 of the tilt motor 130 and a mass m3 of the light projecting portion 220. Accordingly, values of m1, m2, and m3 are adjusted such that the mass m1 of the camera module 210 is almost the same as a sum of the mass m2 of the tilt motor 130 and the mass m3 of the light projecting portion 220. Accordingly, the weight eccentricity generated in the upper and lower directions with respect to the rotation axis R1 may be reduced.

When the mass m1 of the camera module 210 is considerably different from a sum of the mass m2 of the tilt motor 130 and the mass m3 of the light projecting portion 220, a counter weight (not shown) may be further provided to remove a remaining eccentric weight. In detail, when m1 is greater than a sum of m2 and m3, the counter weight may be arranged under the rotation axis R1 of the tilt axis portion 120. In contrast, when m1 is less than the sum of m2 and m3, the counter weight may be arranged above the rotation axis R1 of the tilt axis portion 120. Accordingly, a weight deviation generated in the upper and lower directions with respect to the rotation axis R1 may be reduced.

The method of reducing generation of weight eccentricity is not limited to the above exemplary embodiments. According to an exemplary embodiment, when the light projecting portion 220 is not provided in the camera portion 200 of the security camera system 1000, an additional counter weight or a heavier counter weight may be provided under the rotation axis R1 of the tilt axis portion 120.

As such, as the generation of eccentric weight with respect to the rotation axis R1 of the tilt axis portion 120 is reduced, vibration, noise, and a step-out phenomenon of the tilt motor 130 may be prevented and thus the tilt motor 130 may be sufficiently implemented by using a compact motor. Accordingly, a space taken by the tilt motor 130 decreases and thus space use efficiency may be further improved.

As described above, according to the exemplary embodiments, a security camera system which may simplify driving mechanism and improve space use efficiency may be implemented. Also, the number of necessary parts may be reduced and material costs may be reduced. Accordingly, a security camera system which may be manufactured to be compact and light may be implemented. The inventive concept is not limited to the above effects.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A camera system comprising:
   a camera module;
   a support portion arranged at only one tilt axis side, among two tilt axis sides, of the camera module and connected to a housing bracket or an outside structure;
   a tilt axis portion connected to only the one tilt axis side of the camera module and coupled to the support portion to be rotatable relative to the support portion; and
   a tilt motor configured to transfer a rotation force to the tilt axis portion and move in an orbit around a tilt axis of the tilt axis portion during rotation of the tilt axis portion.

2. The camera system of claim 1, further comprising a light projecting portion arranged in opposition to the camera module with respect to the tilt axis of the tilt axis portion.

3. The camera system of claim 2, wherein the light projecting portion comprises a light source for emitting an infrared ray.

4. The camera system of claim 2, wherein an optical axis of the light projecting portion is parallel to an optical axis of the camera module.

5. The camera system of claim 1, wherein the tilt motor is arranged in opposition to the camera module with respect to the tilt axis of the tilt axis portion.

6. The camera system of claim 1, wherein the support portion extends in a direction crossing a section of the tilt axis portion.

7. The camera system of claim 1, wherein the camera module and the tilt axis portion are connected to the housing bracket only through the support portion.

8. The camera system of claim 1, wherein the support portion is arranged at only the one tilt axis side of the camera module and is not arranged at the other tilt axis side of the camera module.

9. The camera system of claim 1, wherein the support portion has a cantilever shape.

10. The camera system of claim 1, wherein the tilt motor is coupled to the tilt axis portion by a belt.

11. The camera system of claim 10, wherein the tilt motor comprises a tension bearing for adjusting tension of the belt.

12. The camera system of claim 1, wherein the tilt motor has a motor axis portion to rotate around a rotation axis so at to generate the rotation force, and the tilt axis of the tilt axis portion and the rotation axis of the motor axis portion are parallel to each other.

13. The camera system of claim 1, wherein mass of the tilt motor is smaller than mass of the camera module.

14. The camera system of claim 1, further comprising a light projecting portion arranged in opposition to the camera module with respect to the tilt axis of the tilt axis portion and having mass smaller than mass of the camera module.

15. The camera system of claim 14, wherein the mass of the camera module is equal to a sum of mass of the tilt motor and mass of the light projecting portion.

16. The camera system of claim 1, further comprising a counter weight arranged spaced apart from the tilt axis of the tilt axis portion in a lengthwise direction of the support portion.

17. The camera system of claim 1, further comprising only one oil seal interposed between the support portion and the tilt axis portion.

18. A camera system comprising:
   a camera module;
   a support portion arranged at only one tilt axis side, among two tilt axis sides, of the camera module and connected to a housing bracket or an outside structure;
   a tilt axis portion connected to only the one tilt axis side of the camera module and coupled to the support portion to be rotatable relative to the support portion; and
   a tilt motor configured to transfer a rotation force to the tilt axis portion so that a rotating body comprising the camera module performs a tilting rotation with respect to a tilt axis of the tilt axis portion,
   wherein mass of a portion of the rotating body positioned above the tilt axis is substantially the same as mass of a remaining portion of the rotating body positioned below the tilt axis.

19. The camera system of claim 18, wherein the tilt motor is included in the rotating body.

20. The camera system of claim 19, wherein the tilt motor is disposed at only the one tilt axis side.

* * * * *